July 19, 1966 W. E. M. SMITH 3,261,644
BRUSH MAKING MACHINE
Filed May 26, 1965 17 Sheets-Sheet 4

INVENTOR
W. E. M. Smith
BY
ATTORNEY

July 19, 1966  W. E. M. SMITH  3,261,644

BRUSH MAKING MACHINE

Filed May 26, 1965  17 Sheets-Sheet 5

INVENTOR
W. E. M. Smith
BY
ATTORNEY

INVENTOR
W. E. M. Smith
BY
ATTORNEY

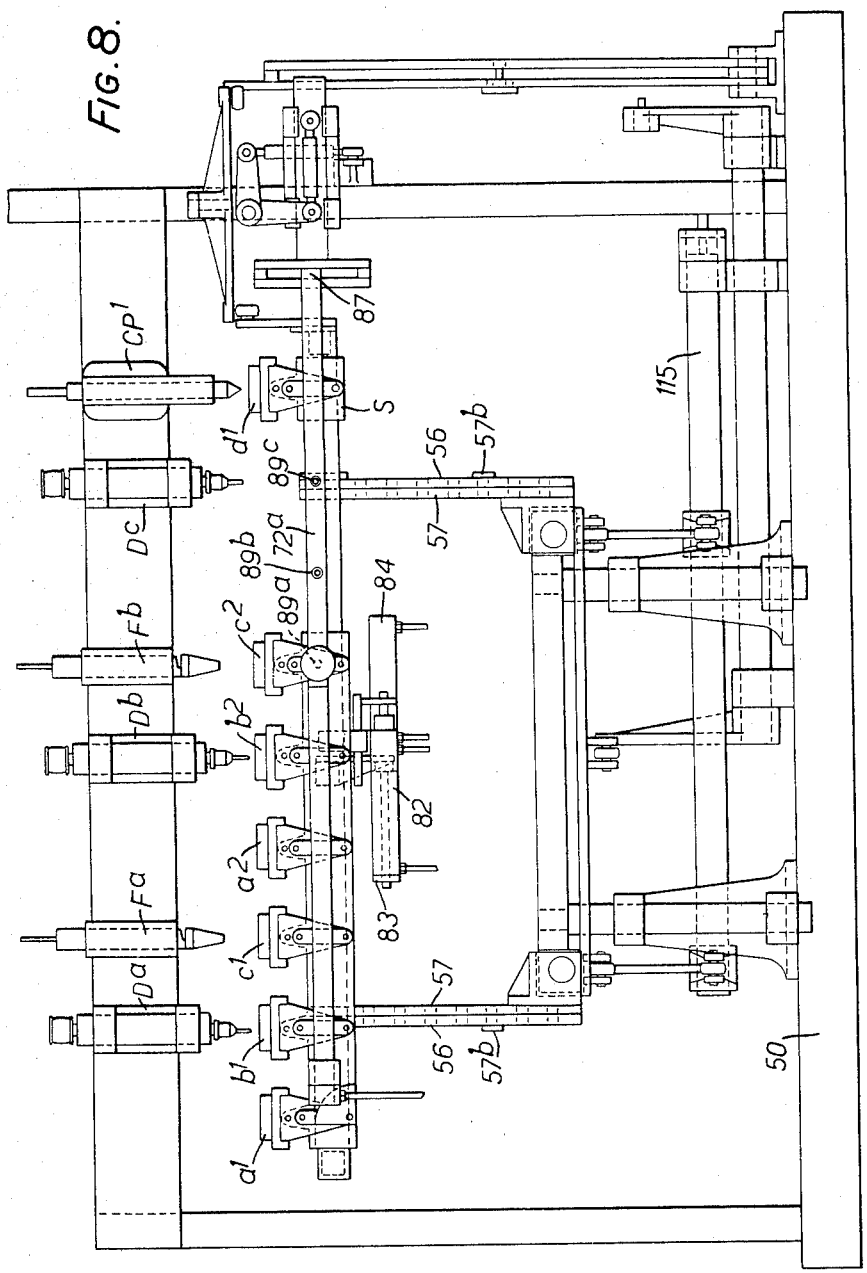

July 19, 1966  W. E. M. SMITH  3,261,644
BRUSH MAKING MACHINE

Filed May 26, 1965  17 Sheets-Sheet 8

INVENTOR
W. E. M. Smith
BY
ATTORNEY

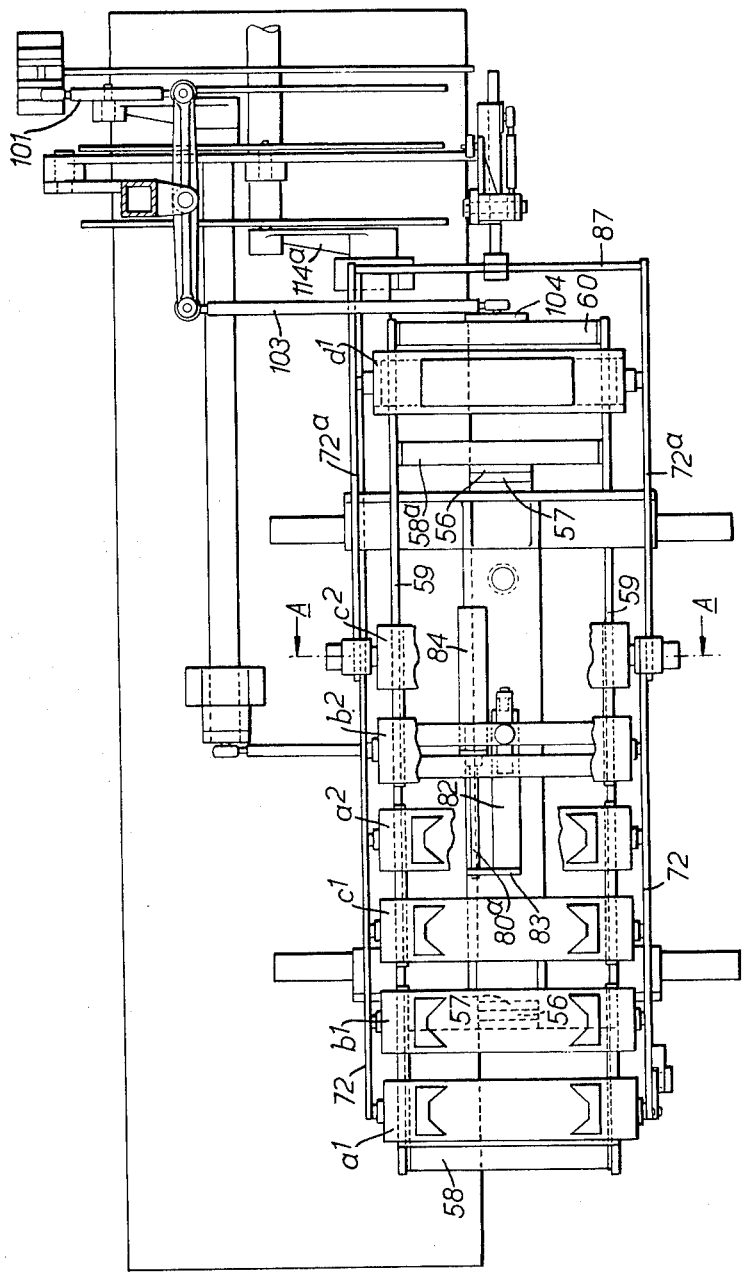

July 19, 1966 W. E. M. SMITH 3,261,644
BRUSH MAKING MACHINE
Filed May 26, 1965 17 Sheets-Sheet 10

INVENTOR
W. E. M. Smith
BY
ATTORNEY

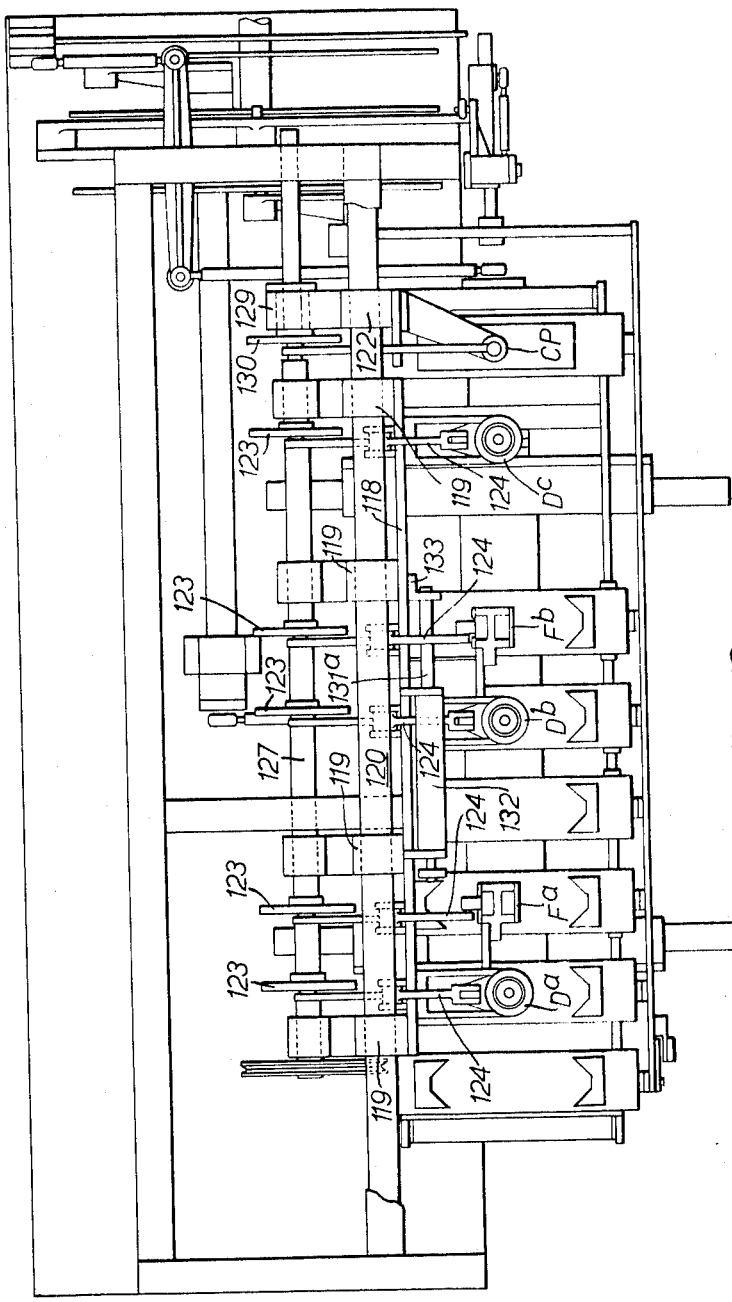

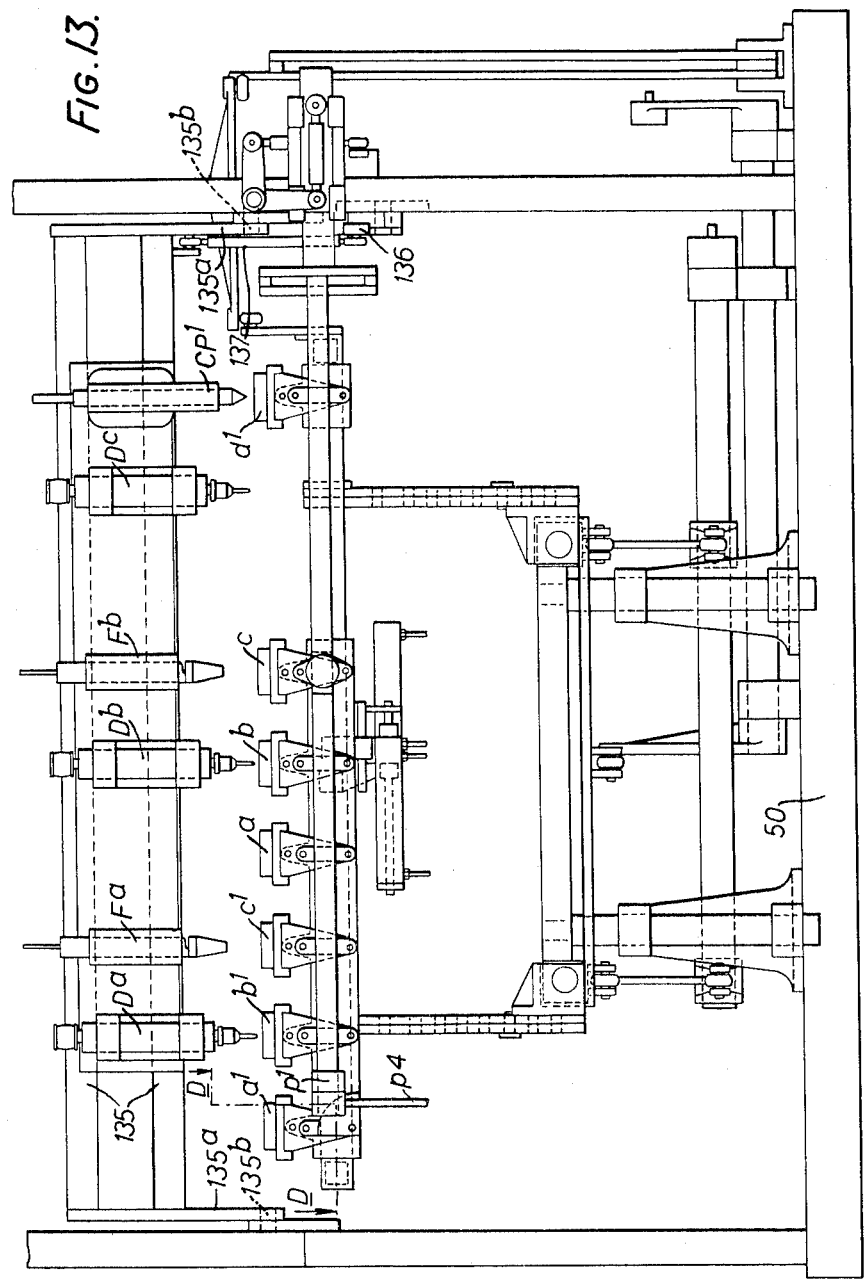

July 19, 1966     W. E. M. SMITH     3,261,644
BRUSH MAKING MACHINE
Filed May 26, 1965     17 Sheets-Sheet 17

INVENTOR
W. E. M. Smith
BY
Holcomb, Wethwill & Dubois
ATTORNEYS

United States Patent Office 3,261,644
Patented July 19, 1966

3,261,644
BRUSH MAKING MACHINE
William Eric Mortimore Smith, East Cosham, England, assignor to J. Evans & Son (Portsmouth) Limited, Portsmouth, England, a British company
Filed May 26, 1965, Ser. No. 461,601
Claims priority, application Great Britain, Nov. 21, 1962, 44,048/62
11 Claims. (Cl. 300—3)

This application is a continuation-in-part of pending application U.S. Serial No. 324,120, filed November 15, 1963, now abandoned.

This invention relates to apparatus for automatically boring and filling brush stocks.

It is an object of the invention to provide a brush making machine including boring and filling tools and a set of workholders which are movable relative to the tools to present brush stocks on the workholders to the tools.

It is another object of the invention to provide a brush making machine wherein a set of workholders is moved in a cycle of step-like movements relative to boring and filling tools.

It is a further object of the invention to move a set of workholders relative to boring and filling tools in a cycle comprising a series of step-like movements in one direction and a single movement in a reverse direction to return the workholders to their initial position.

It is a still further object of the invention to provide a brush making machine having at least one set of tools, each set comprising a pair of boring tools and a filling tool and a set of three aligned workholders for each set of tools, the workholders being movable by step-like increments relative to the tools so that each workholder is presented to a boring and a filling tool during the cycle of step-like movements.

To enable the invention to be fully understood, it will now be described, by way of example, with reference to the accompanying drawings in which:

FIGURE 7 is a fragmentary sectional view of an enlarged scale on the line B—B of FIGURE 6a;

FIGURE 8 is an elevation of a second embodiment of the invention which is diagrammatically illustrated in FIGURE 2;

FIGURE 9 is a plan view of FIGURE 8;

FIGURE 12 is a plan view of FIGURE 10;

FIGURE 13 is an elevation of a still further embodiment of the invention;

Figure 1:
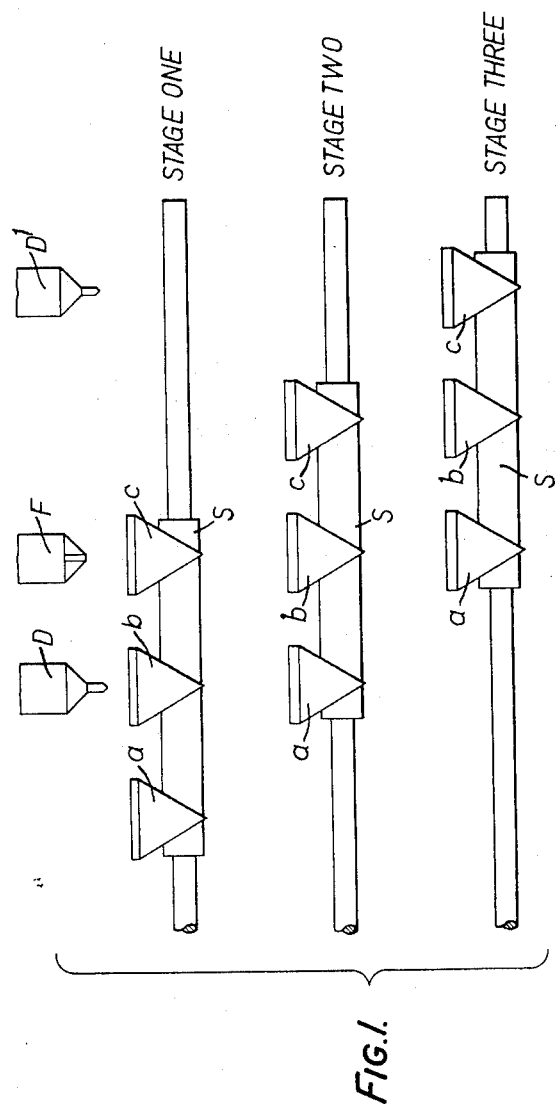
FIGURE 1 is a diagrammatic illustration of one embodiment of the invention.
Figure 2:
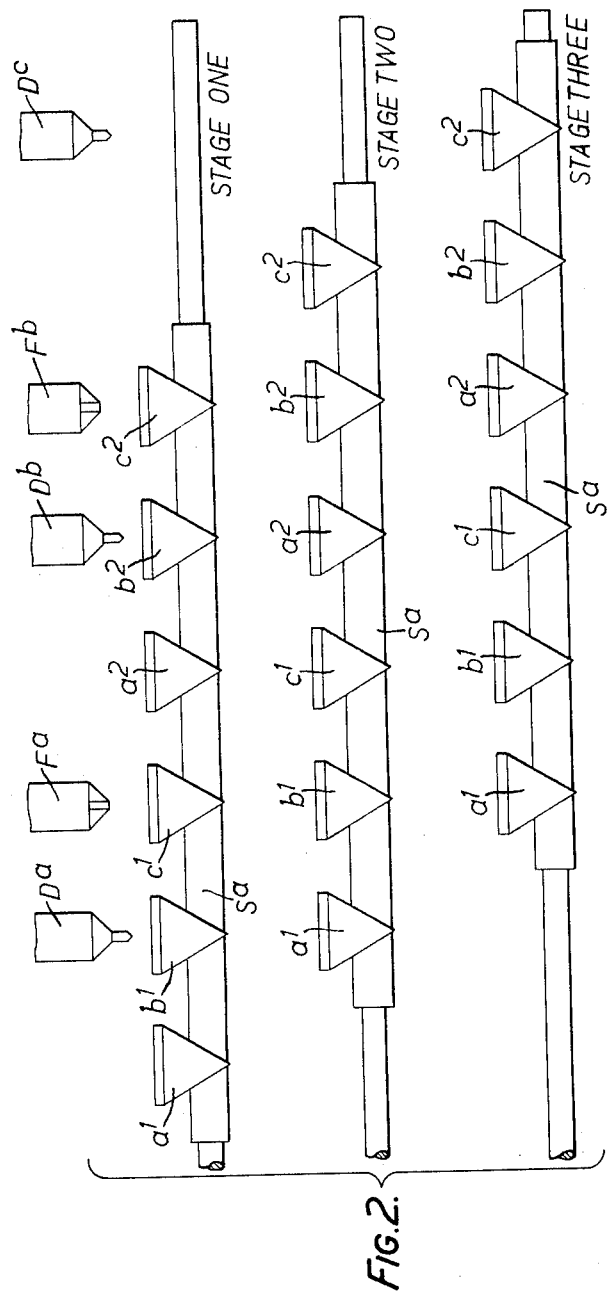
FIGURE 2 is a diagrammatic illustration of a second embodiment.

The invention is diagrammatically illustrated in FIGURES 1 and 2 of the accompanying drawings, and as shown in FIGURE 1, a set of three workholders $a$, $b$, $c$ is provided pivotally mounted on a support S which is transversely slidable by suitable means not shown. The workholders are adapted to support brush stocks and are preferably interconnected by link means adapted to be actuated by a pattern cam in the brush making machine to pivot the workholders relative to the support S during the boring and filling operations so as to orient the workholders to present the brush stocks into correct positions relative to the boring and filling tools.

As shown, two boring tools D and $D^1$ and a single filling tool F are provided, the boring tool D being located at one side of the filling tool at a distance equal to that between the vertical centre lines of two adjacent workholders, and the second boring tool $D^1$ is located at the other side of the filling tool at a distance equal to twice that between the vertical centre lines of two adjacent workholders.

At the start of a boring and filling operation, an undrilled brush stock will be positioned on the workholders $a$ and $b$ and a pre-drilled brush stock will be positioned on the workholder $c$. This is indicated in FIGURE 1 as STAGE ONE.

To start the operation, a switch is closed to actuate the main drive means to operate the tools and effect their vertical movement relative to the workholders in known manner such that the brush stock on the holder $b$ is driled and that on the holder $c$ filled. It will be understood that during this operation, the holders will be pivoted so that the brush stocks will be correctly oriented relative to the boring and filling tools to ensure that the brush stocks will be drilled and filled according to the desired pattern.

At the completion of the boring and filling operation, the main drive is automatically switched off and auxiliary drive means energised to move the support S transversely into the position indicated as STAGE TWO in FIGURE 1. During this movement the filled brush stock on the workholder $c$ will be unclamped and that on workholder $a$ clamped. It will be noted that the undrilled brush stock on holder $a$ is now in operative position relative to the boring tool D, the drilled brush stock on holder $b$ is in operative position under the filling tool F, and the filled brush stock on holder $c$ at a loading/unloading position spaced between the filling tool F and the second boring tool $D^1$. The auxiliary drive means is now automatically switched off and the main drive re-engaged to effect a second boring and filling operation, and the brush stock on the holder $a$ is drilled and that on holder $b$ filled. During this operation, the filled brush stock on holder $c$ is removed and a fresh undrilled brush stock substituted.

At the completion of this second boring and filling operation, the main drive is again switched off and the auxiliary means energised to effect a second transverse movement of the support S into the position indicated as STAGE THREE in FIGURE 1 wherein the workholder $c$ carrying the undrilled brush stock is positioned under the second boring tool $D^1$, the workholder $b$ is at the unloading position between the filling tool F and the second boring tool $D^1$, and the workholder $a$ is under the filling tool F. During the movement of the support S the brush stock on holder $b$ is unclamped and that on holder $c$ is clamped. The auxiliary drive is switched off and the main drive engaged, and during a subsequent boring and filling operation, the filled brush stock on holder $b$ is removed and a fresh undrilled brush stock substituted.

At the completion of this third boring and filling operation, the support S is moved transversely in the opposite direction to the first two movements to return the workholders into the STAGE ONE position, wherein the drilled brush stock on holder $c$ is positioned under the filling tool F, the undrilled brush stock on the holder $b$ is under the boring tool D, and the filled brush stock on the holder $a$ is disposed outwardly (to the left as shown in FIGURE 1 of the drawings) of the boring tool D. During this movement of support S the brush stock on holder $b$ is clamped and that on holder $a$ unclamped ready to be removed and new brush stock substituted during the next cycle of operations.

The cycle of operations is then repeated so that the apparatus operates continuously to bore and fill brush stocks.

With reference to the embodiment illustrated in FIGURE 2 of the accompanying drawings, two sets of three workholders are provided indicated as $a^1$, $b^1$, $c^1$, $a^2$, $b^2$, $c^2$, the holders being pivotally mounted on a transversely slidable support $S^a$. Two pairs of boring and filling tools $D^a$, $F^a$, $D^b$, $F^b$, and a third boring tool $D^c$ are provided.

Initially, the workholders are in the position indicated as STAGE ONE in FIGURE 2 of the drawings, and undrilled brush stocks are positioned on the holders $a^1$, $b^1$, $a^2$, $b^2$, and pre-drilled brush stocks are positioned on the holders $c^1$ and $c^2$. When the main drive of the machine is switched on, the boring and filling tools $D^a$, $D^b$, $F^a$, $F^b$ are operated so that the brush stocks on holders $b^1$, $b^2$ are drilled and those on holders $c^1$, $c^2$ are filled.

At the completion of the boring and filling operation, the main drive is switched off and auxiliary means energised to move the support $S^a$ transversely into the position indicated as STAGE TWO, wherein the holders $a^1$, $a^2$ carrying undrilled brush stocks are positioned under the boring tools $D^a$, $D^b$, the holders $b^1$, $b^2$ are positioned under the filling tools $F^a$, $F^b$, the workholder $c^1$ is disposed at a loading position between the filling tool $F^a$ and the boring tool $D^b$, and the workholder $c^2$ is disposed at a second loading position between the filling tool $F^b$ and the boring tool $D^c$. During this movement of the support $S^a$ the brush stock on workholders $c^1$, $c^2$ are unclamped and those on $a^1$, $a^2$ clamped.

At the completion of the transverse movement, the auxiliary means is switched off and the main drive switched on, both automatically, and a second boring and filling operation is carried out during which the filled brush stocks on holders $c^1$, $c^2$ are removed and undrilled brush stocks substituted.

At the completion of this second boring and filling operation, the main drive is again switched off and the auxiliary means energised to move the workholders transversely into the position indicated as STAGE THREE, wherein the workholders $a^1$, $a^2$ carrying drilled brush stocks are positioned under the filling tools $F^a$, $F^b$, the workholders $c^1$, $c^2$ carrying undrilled brush stocks are under the boring tools $D^b$, $D^c$, respectively, and the workholders $b^1$, $b^2$ are at loading/unloading positions. During this movement of the support $S^a$, the brush stocks on holders $b^1$, $b^2$ are unclamped and those on holders $c^1$, $c^2$ clamped.

At the completion of the transverse movement, the auxiliary means is switched off and the main drive switched on to carry out a third boring and filling operations during which the filled brush stocks on the holders $b^1$, $b^2$ are removed and undrilled brush stocks substituted.

At the completion of this third boring and filling operation, the main drive is switched off and the auxiliary means energised to move the support $S^a$ transversely in the reverse direction such that the workholders are returned into the position indicated as STAGE ONE in FIGURE 2, during this movement of the support $S^a$ the brush stocks on holder $a^1$, $a^2$ will be unclamped and those on holder $b^1$, $b^2$ clamped. During a subsequent drilling and filing operation the filled brush stocks on holders $a^1$ and $a^2$ are removed and undrilled brush stocks substituted.

The parts are now in position for the cycle of operations to be repeated so that the apparatus operates continuously to bore and fill brush stocks.

With reference to the practical embodiment of the invention illustrated in FIGURES 3 to 7 of the accompanying drawings, a brush making machine includes a base 50 supporting vertically extending bearings 51 in which pillars 52 are slidably mounted, the pillars supporting a horizontally extending cross beam 53.

A runner 54 is provided at each opposite end of the cross beam, and each serves to support a slide 55. Pairs of support plates 56, 57 extend upwardly of the slides 55, the plates having apertures 56a, 57a respectively, at vertically spaced intervals. The plates 56 are connected at their lower end to the slides 55, and the plates 57 are connected adjacent their upper ends to cross bars 58, 58a which extend between and are connected to opposed side bars 59. The respective plates 57 are pivotally connected to the respective plates 56 by pivot pin 57b extending through a selected pair of aligned apertures 56a, 57a the degree and extent of the pivotal movement depending on which of the pairs of aligned apertures in the plates are connected by the pivot pins. The side bars 59 and cross bars 58, 60 form a cradle-like support for an assembly of three workholders $a$, $b$, $c$.

Figure 6:
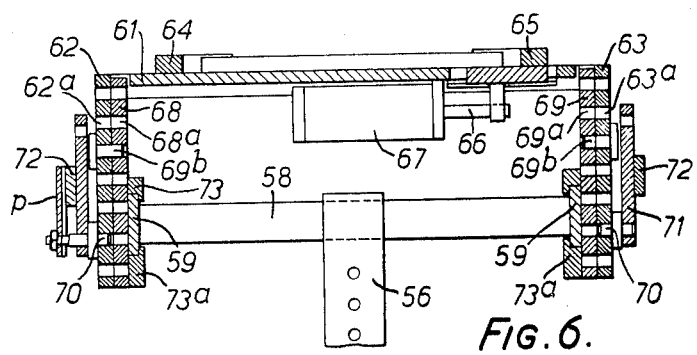
FIGURE 6 is a section on the line C—C of FIGURE 3.

As shown more particularly in FIGURE 6, each workholder comprises a base 61 and opposed side plates 62, 63. A pair of clamping jaws are mounted on the base and comprise a fixed jaw 64 and a movable jaw 65, the latter being adapted to be reciprocated relative to the jaw 64 by a piston rod 66 connected with a piston operating in a cylinder 67. Fluid under pressure is normally supplied to the cylinder 67 to move the jaw 65 inwardly into clamping position. When, however, the workholder is in the loading/unloading position to be referred to later, the supply of fluid pressure is controlled to move the jaw 65 outwardly to unclamp the brush stock to enable it to be unloaded, the jaw being moved inwardly to endwise clamp the new brush loaded on to the base 61.

The side plates 62, 63 are respectively pivotally connected to support plates 68, 69 by pins 69b inserted through pairs of aligned apertures 62a, 68a, 63a, 69a. The plates 62, 63 are also pivotally connected by pins 70 to members 71 secured to side bars 72 which extend in parallel spaced relation to the side bars 59.

Figure 3:
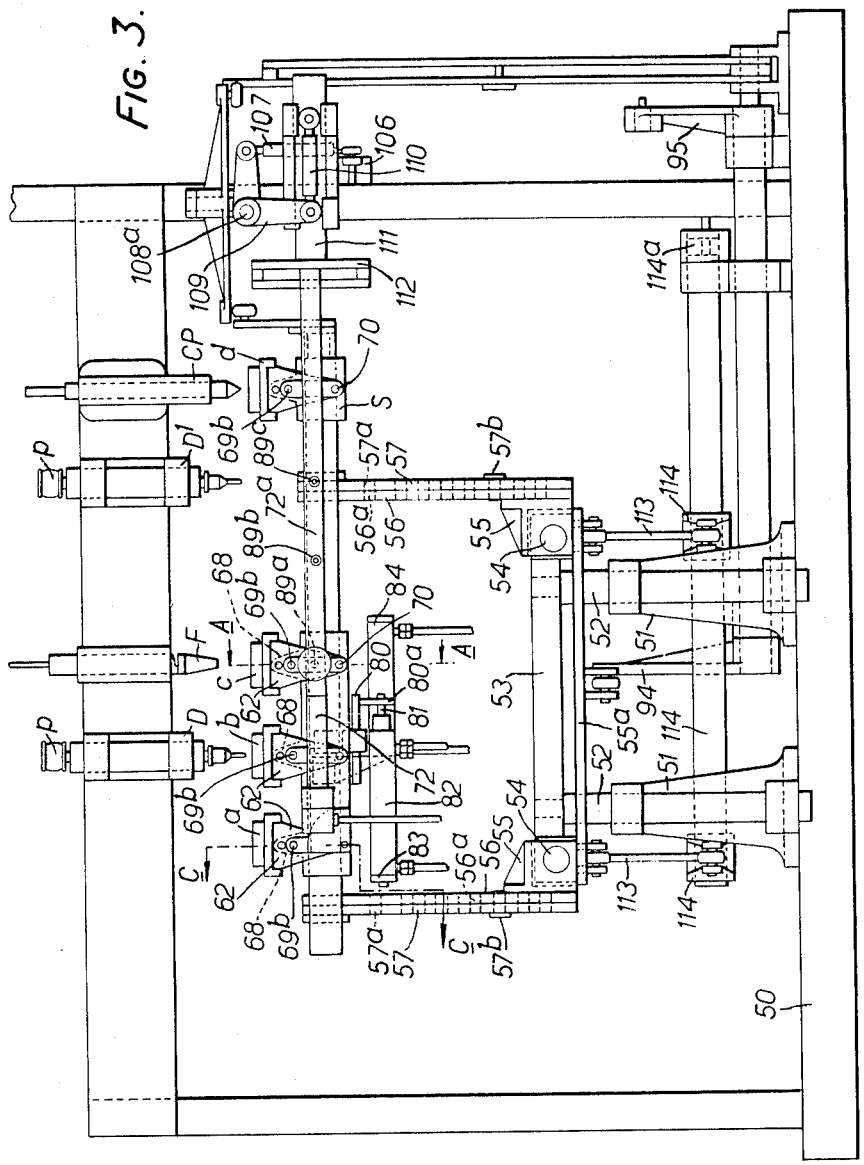
FIGURE 3 is an elevational view of a practical embodiment of that ilustrated in FIGURE 1.
Figure 4:
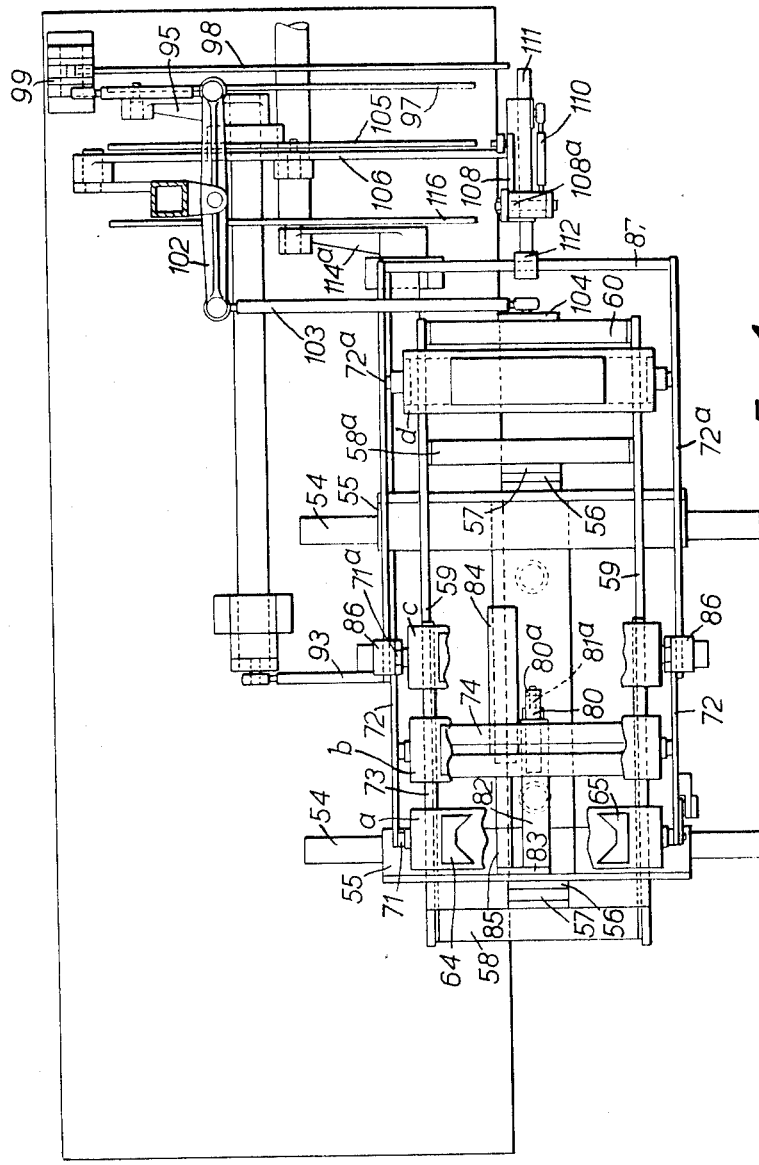
FIGURE 4 is a plan view of FIGURE 3.
Figure 5:
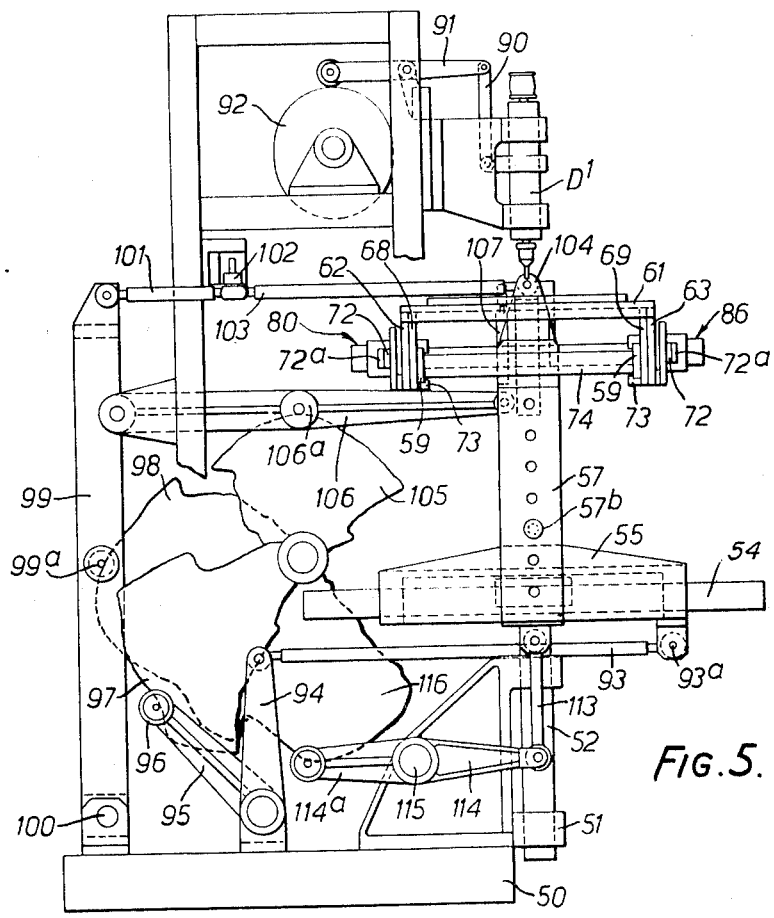
FIGURE 5 is a side view.
Figure 6A:
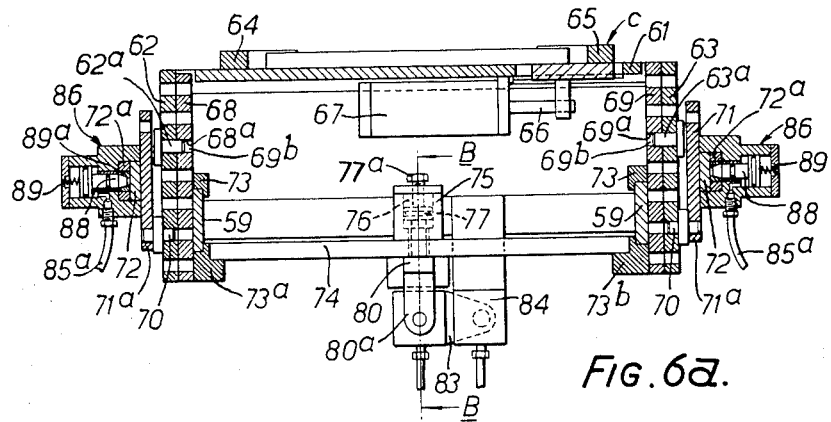
FIGURE 6a is a section on the line A—A of FIGURE 3.
Figure 7:
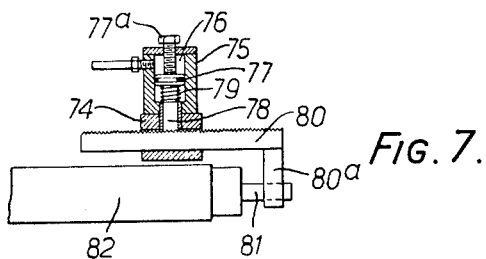

The support plates 68, 69 of each holder are secured to channel guides 73, 73a which slidably receive the respective side bars 59 as shown more particularly in FIGURE 6a which is a section on line A—A of FIGURE 3 through the workholder $c$.

A cross piece 74 extends between and is connected to the opposed guides 73, 73a and has a housing 75 attached thereto providing an air chamber 76 in which a piston 77 carrying a plunger 78 (FIGURE 7) is mounted, the piston being normally forced by a locking screw 77a into a position to urge the plunger 78 to make clamping engagement with a toothed bar 80 extending transversely of the cross piece 74.

The locking screw 77a clamps the bar 80 when the apparatus is adapted to affect side spread filling and drilling. If only upright filling and drilling is to be effected, the locking screw is released to allow plunger to be unclamped by spring 79 and in this case the bar 80 is clamped by a supply of fluid pressure to air chamber 76 only when the workholders are to be moved transversely at the completion of a drilling and filling operation.

At one end the bar 80 has a depending lug 80a connected to a rod 81 (FIGURE 7) of a piston operating in an air cylinder 82 secured to a support 83.

A second air cylinder 84 is attached to the bar 80 and houses a piston, the rod 85 (FIGURE 4) of which is connected to the support 83.

As shown in FIGURE 6a, the side plates 62, 63 of the workholder *c* are pivotally connected to members 71*a* secured to the side bars 72, a plunger assembly generally indicated by 86 being secured to the member 71*a* and including a guide channel in which the side bar 72*a* extend in side by side parallel arrangement, the ends of the side bars 72*a* being connected to a cross bar 87. The plunger assembly includes a plunger 88 normally urged by a spring 89 to engage in one of the recesses 89*a*, 89*b*, 89*c* in the side bars 72*a*, to lock the side bars 72, 72*a* to one another. It will be understood that fluid pressure can be supplied to the plunger assembly through conduit 85*a* to retract the plunger 88, and the side bars 72 and the workholders *a*, *b*, *c* supported thereby can then be moved relatively to the side bars 72*a*, by supplying fluid under pressure to the cylinders 82, 84.

As shown in the accompanying drawings, a further workholder *d* is provided adapted to support a "control" plate for co-operating with a "control point" C.P. in known manner. The workholder *d* supports a control plate which is in fact a replica of the face of the brush stock mounted on the other workholders, i.e. it has a series of accurately drilled tapered holes corresponding to the pattern of holes in the brush stocks. During the drilling and filling operations, the workholder *d* is given the same tilting movements as the other workholders and on the drilling or filling of each hole in the brush stocks, the control point enters a corresponding hole in the control plate thereby controlling the accuracy of the filling and drilling of the holes in the brush stocks on the workholders *a*, *b*, *c*. However, at the time the workholders *a*, *b*, *c* are indexed from one station to another, they are disconnected from the workholder *d* by withdrawing the plunger 88, thus disconnecting the side bar 72 connected to the workholders *a*, *b* and *c* from the side bar 72*a* connected to the workholder *d*, so that only the workholders *a*, *b*, *c* are indexed, the workholder *d* remaining under the control point and being reconnected with the other workholders at the end of the indexing movement. The workholder *d* is similar to the workholders *a*, *b*, *c*, its side plates being pivotally connected to support plates similar to 68, 69 of FIGURE 6 which are supported on a slide *s* slidably mounted on the side bars 59. The slide *s* will be locked against sliding movement when the apparatus is being used for side spread filling and unlocked when used for upright filling across a brush. The locking may be effected by any suitable means such as the insertion of a locking pin into aligned apertures in the slide *s* and bars 59. The workholder *d* carrying the control plate is accordingly always in correct relation to the control point C.P. and it is not therefore necessary to provide additional control plates as would be the case if the holder *d* were moved transversely relative to the control C.P. when the workholders *a*, *b*, and *c* are indexed. The side plates are also pivotally connected to the side bars 72*a*, and accordingly when the side bars 72*a* are locked to the side bars 72 by the plungers 88, reciprocating movement imparted to the side bars 72*a* will effect a rocking movement to the workholders *a*, *b*, *c*, *d* about the pivot pins 69*b* which pivotally connect the side plates, of the holders to the support plates 68, 69. This pivotal movement is used for side spread effect, and it will be understood that the amount and degree of pivotal movement will be determined by the particular pair of aligned apertures in which the pivot pins 69*b* are assembled.

Mounted above the workholder assembly, are two boring tools D, D¹, a filling tool F and the control tool C.P. The parts will be in the position indicated in FIGURE 3, at the start of a filling operation, an undrilled brush stock being clamped to the workholders *a*, *b*, and a pre-drilled brush stock clamped to the workholder *c*. A control plate formed with a predetermined pattern of holes is mounted on the workholder *d*. It will be noted that the workholder *a* is spaced laterally of the boring tool D at an unloading position, the workholder *b* is in operative relation to the boring tool D, and workholder *c* is in operative relation to the filling tool F. It will also be noted that the tool F is spaced from the tool D, the equivalent of the distance between vertical centre lines of two adjacent workholders, and the tool D¹ is spaced from the tool F twice this distance.

At the start of the operation of the machine, the main drive of the machine is switched on to operate the boring tool D, which will be rotated in known manner by belts engaging the pulley *p*. The tools D, D¹ and F will also be reciprocated towards and away from the workholders in timed sequence by a series of links, levers and cams as indicated by 90, 91, 92. During the drilling and filling operation, the workholders will be oriented with respect to the tools to enable the desired pattern of holes to be drilled and filled. The mechanism for controlling the orientation will be described later.

At the completion of the boring and filling operation, the main drive is automatically switched off and an auxiliary drive automatically switched on, the latter controlling valves to supply fluid under pressure to the plunger assembly 86 to withdraw the plunger 88 from the aperture 89*a* so that the side bars 72*a* are uncoupled from the side bars 72 and are free to slide relatively thereto. Fluid under pressure is also supplied to a cylinder 84 to retract the piston rod 85 with the result that the side bars 72 and the workholders *a*, *b* and *c* connected thereto are given a step-like movement relative to the tools, and at the end of this movement, the plunger 88 automatically engages in the aperture 89*b* to again lock the side bars 72 to the side bars 72*a*.

At the completion of the step-like movement, the workholder *a* which carries an undrilled brush stock is positioned in operative relation with respect to the boring tool D, the workholder *b* which carries a brush stock which has just been drilled is in operative relation to the filling tool F, and the workholder *c* which carries the brush stock which has just been filled is positioned between the tools F and D¹ at a convenient position for unloading and loading. It will be understood that the indexing movement of the workholders is effected at the completion of a drilling and filling operation.

During the indexing movement fluid under pressure is supplied to the respective cylinders 67 to unclamp the brush stock on holder *c* and clamp that on holder *a*. The brush stock on holder *b* will have been clamped before the start of operations and remains clamped.

The apparatus is now in position for the next drilling and filling operation, and the brush stock on the holder *a* is drilled by the tool D and that on the holder *b* is filled, and during this operation the filled brush stock on holder *c* is removed and a fresh undrilled brush stock substituted.

At the end of the second boring and filling operation, the main drive is again automatically switched off, and the auxiliary drive switched on to control the valves to again release the plunger 88 and supply fluid pressure to the cylinder 82, the piston of which is extended to effect a second step-like movement of the workholders *a*, *b*, and *c*, at the end of which the plunger 88 automatically engages the aperture 89*c* in the side bar 72*a*. The workholder *a* supporting a drilled brush stock is now under the filling tool F, the workholder *b* supporting a filled brush stock is at the unloading and loading station between the tools F, D¹, and the workhloder *c* supporting an undrilled brush stock is in operative relation to the boring tool D¹. During this indexing movement the filled brush stock on holder *b* is unclamped and that on holder *a* clamped. The auxiliary power is then switched off and the main drive switched on to actuate the tools to effect the next drilling and filling operation, and while this is taking place, the filled brush stock on the workholder *b* is removed and a fresh undrilled brush stock is substituted.

At the end of this third boring and filling operation, the main power is again switched off and the auxiliary power switched on to control the valves to release the plunger 88, but this time the valves supply fluid under pressure to both cylinders 82, 84 to actuate the respective piston rods to impart a transverse movement to the workholder in a reversed direction and equivalent to the sum of the previous movement so that the parts are returned to the position illustrated in FIGURE 3, and the plunger 88 automatically engages in the aperture 89*a* in the side bars 72*a* to lock the latter to the side bars 72. During this indexing movement the filled brush stock on holder *a* is unclamped and that on holder *b* clamped. The auxiliary power is then switched off and the main power switched on to start another cycle of operations, and during the boring and filling operations the filled brush stock on holder *a* is removed and a fresh undrilled brush stock substituted.

The cycle of operations is repeated indefinitely so that the machine is fully automatic in operation, the workholders being automatically moved in step-like increments at the end of each successive boring and filling operation, and during the said operations, the necessary unloading and loading of the workholders is carried out.

It will be noted that each cycle of relative movements comprises three steps and during each cycle, each workholder is presented to the filling tool and to one or other of the boring tools.

The invention can be used for operating on various types of brush stocks adapted to have different patterns of upright, end spread and side spread fillings, the workholders being given the desired movements to effect such patterned drilling and filling by suitably shaped cams.

To effect the desired movement of the workholders when upright drilling and filling lengthwise of the brush stock is required the workholder assembly is moved along the runners 54 by a link 93 pivoted at 93*a* to a bar 55*a* connected to the members 55 and at the other end to an arm 94 fixed on a shaft 94*a* carrying on its other end an arm 95 having a follower 96 engaging a cam 97. The cam accordingly effects the reciprocal movement of the link 93 to effect the transverse movement of the workholder assembly relative to the tools.

When no upright filling lengthwise of the brush stock is required, the members 55 will be locked, by suitable means to the runners 54.

The cam 98 controls movement of the workholders for end spread filling and drilling. The cam is adapted to effect the pivotal movement of a lever 99, one end being pivoted at 100 to the base, and pivoted at the other end to a link 101 connected through a lever 102 to a link 103 which is pivoted to a plate 104 screwed to a cross member 60 connected between the side bars 59. The pivotal movement of the lever 99 will accordingly be transmitted to the plate 104 to pivot the workholder assembly about the pivot pins 57*b* in the aligned apertures 56*a*, 57*a*.

The movement of the workholders for effecting side spread is controlled by a cam 105 which pivots a lever 106 pivoted to a link 107 which is connected to one arm 108 of the bell crank lever pivoted at 108*a* and having a second arm 109 pivoted to a link 110 whose other end is pivotally connected to a slide bar 111 connected to the slotted guide 112.

Accordingly, the movement of the lever 106 by cam 105 is transmitted to the slide bar 111 and side bars 72, 72*a* to effect the pivotal movement of the workholders about pivots 69*b* for side spread filling and drilling.

It will be understood that the various cams will be contoured to impart the necessary movement to the workholders and operated in timed relation to the operation of the machine so that the workholders will be correctly presented to the tools to enable the desired pattern of holes to be drilled and filled.

To compensate for the pivotal movement of the workholders so as to ensure the workholders are maintained at the correct height relative to the tools, the cross beam 53 is pivotally connected by links 113 to levers 114 mounted on the shaft 115 having another lever 114*a* operable by a cam 116 contoured to a predetermined pattern to raise or lower the workholder assembly automatically to produce the desired compensating movement.

The mounting of the workholders has important advantages in enabling the apparatus to be readily adapted for carrying out different patterns of drilling and filling. As described above, the workholders will be automatically pivoted during the drilling and filling operations to effect spread filling including end and side spread.

If the centre portion lengthwise of a brush is to have upright filling and the ends spread filling, the necessary movements will be obtained from cams 97, 98. For this arrangement, members 55 will be free to slide on runners 54 under the action of the cam 97, levers 94, 95 and link 93 for the desired length of upright filling. Cam 98 will be contoured to maintain the workholders in a horizontal position through levers 99, 102 and links 101, 103. At each end of the portion of upright filling, the cam 97 will continue in a concentric periphery so that the workholder will be maintained in the desired position on runners 54. End spread will then be applied by cam 98 through levers 99, 102, and links 101, 103.

If the full length of a brush is to receive upright filling, the link 103 would be disconnected and the plates 56, 57 locked against relative pivotal movement by suitable means, for example, by inserting a second pin through two aligned holes in the plates. In this case the full length of the brush stock will be transversed by movement of the slides 55 along the runners 54. Side spread, if required, would be effected as previously described by the cam 105.

When upright filling is required across a brush stock, the workholders will be locked against pivotal movement, for example, by the insertion of a second pin through aligned holes in the side and support plates 62, 68, 63, 69. The locking screw 77*a* will be removed and the locking pin of the control plate workholder removed, if previously inserted. During the drilling and filling operations, the plunger 78 will be urged by its spring out of engagement with the bar 80 so that the workholders will be free to move relatively to the bar 80, under the action of the side bars 72, 72*a* which receive their movement from the cam 105. At the completion of the drilling and filling operation, the plunger 78 will be moved into locking position, by supply fluid under pressure to operate the piston 77 and the plungers 88 released from the side bars 72*a* to permit the workholder assembly to be given its step-like movement as hereinbefore described to position the workholders in the next working position relative to the tools. At the completion of the step-like movement, the plungers 88 will be re-engaged with the side bar 72*a*, and the plunger 78 released to permit movement of the workholders during the next drilling and filling operation.

The advantages of the workholder mounting is not necessarily confined to the brush making machine as described herein but applies to brush making machines generally.

It will be noted that each of the workholders is presented to the filling tool F and to one or other of the drilling tools during the cycle of three step-like movements.

The invention is not limited to workholder assemblies comprising three workholders, and FIGURES 8 and 9 illustrates a practical embodiment of that diagrammatically illustrated in FIGURE 2 and including two sets of three workholders.

The workholders are pivotally connected as described with reference to FIGURES 3 to 6 and the cams and levers for controlling the operation of the machine and the movement of the workholders are identical to that described, with reference to FIGURES 3 to 6*a*. Further, a workholder D[1] is provided supporting a "control" plate for co-operation with a "control point" C.P.[1].

At the start of the operation, undrilled brush stocks will be mounted on the workholders $a^1$, $b^1$, $a^2$, $b^2$, and pre-drilled brush stocks on the workholders $c^1$, $c^2$. The main power is switched on and the tools operated to drill the brush stocks on holders $b^1$, $b^2$ and fill the brush stocks, on holders $c^1$, $c^2$ and when this is completed, the main power is automatically switched off and auxiliary power automatically energised to effect a first step-like movement to the workholder assembly to position workholders $a^1$, $a^2$ carrying undrilled brush stocks under the drilling tools $D^a$, $D^b$, and the workholders $b^1$, $b^2$ carrying drilled brush stocks under the filling tools $F^a$, $F^b$.

During this indexing movement fluid under pressure is supplied to the respective cylinders 67 to unclamp the filler brush stocks on holders $c^1$, $c^2$ and clamp these on holders $a^1$, $a^2$. The brush stocks on holders $b^1$, $b^2$ will have been clamped before the start of the operational cycle and remain clamped.

The auxiliary power is then switched off and the main power switched on to operate the tools, and during the drilling and filling operation, the filled brush stocks on the holders $c^1$, $c^2$ will be removed and undrilled brush stocks substituted.

At the end of this second drilling and filling operation, the main power is switched off and the auxiliary power energised to effect a second step-like movement of the workholder assembly to position workholders $a^1$, $a^2$ carrying drilled brush stocks under the filling tools $F^a$, $F^b$, and the workholders $c^1$, $c^2$ carrying undrilled brush stocks under the drilling tools $D^b$, $D^c$. During this indexing movement the brush stocks on holders $b^1$, $b^2$ are unclamped and those on holders $c^1$, $c^2$ clamped. The auxiliary power is then switched off and the main power switched on to effect the third drilling and filling operation, and during this, the filled brush stocks on the workholders $b^1$, $b^2$ will be removed and undrilled brush stocks substituted.

At the end of this third drilling and filling operation, the main power is switched off and the auxiliary power energised to effect a reverse transverse movement equal to the sum of the previous two movements return the workholder assembly into the position indicated in FIGURE 8 ready for another cycle of operations.

During this indexing movement the filled brush stocks on holders $a^1$, $a^2$ are unclamped and those on holders $b^1$, $b^2$ clamped. During the next drilling and filling operation, the filled brush stocks on the workholders $a^1$, $a^2$ will be removed and undrilled brush stocks substituted.

Figure 8A:
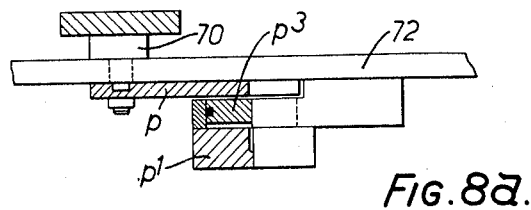
FIGURE 8a is a section on an enlarged scale on line D—D of FIGURE 13.

To prevent pivotal movement of the workholders during the transverse indexing movement, a clamping device illustrated in FIGURE 8a is provided. As shown, a plate $p$ is fixed on the pivot pin 70 of the workholder $a^1$ and extends in parallel relation to a side bar 72 and is moved relative hereto when the workholders are pivoted for side spread.

A housing $p^1$ is mounted on the side bar 72 and a pad $p^3$ positioned in the housing. A conduit $p^4$ is connected to the housing, and when a transverse indexing movement is to be connected, fluid under pressure is supplied to the housing $p^1$ towards the pad $p^3$ inwardly to press the plate $p$ into frictional engagement with the side bar 72 so as to prevent pivotal movement of the workholders.

According to the embodiment so far described, the workholder assembly has been moved relatively to the tools. In the embodiment illustrated in FIGURES 10, 11 and 12, the tools are adapted to be moved relatively to the workholder assembly. As shown, the tools $D^a$, $D^b$, $D^c$, $F^a$, $F^b$, are mounted on a plate 117 provided with brackets 118 formed with extensions 119 which are slidably mounted on runners 120 supported on side members 121 of the machine frame. The control point C.P.$^1$ with its operating mechanism is mounted on a bracket 122 which is fixed to the runners 120. A cam 123 supported on the plate 117 is provided for each tool for actuating a lever 124 connected by a link 125 to the tool, the lever 124 being supported by an arm 126 connected with the plate 117.

The various cams 123 are mounted on a drive shaft 127, the shaft having a splined extension 128 to permit sliding movement of the shaft relative to a sleeve 129 which supports the cam 130 which operates the control point C.P.$^1$.

Fluid pressure cylinders 131, 132 are provided, the cylinder 132 being supported on part of the machine frame, and a piston rod 131a of a piston operating in the cylinder 131 is connected to a bracket 133 attached to the bracket 118, and the piston rod 132a of the piston operating in the cylinder 132 is connected to a plate 134 attached to the rear end of the cylinder 131.

Figure 11:
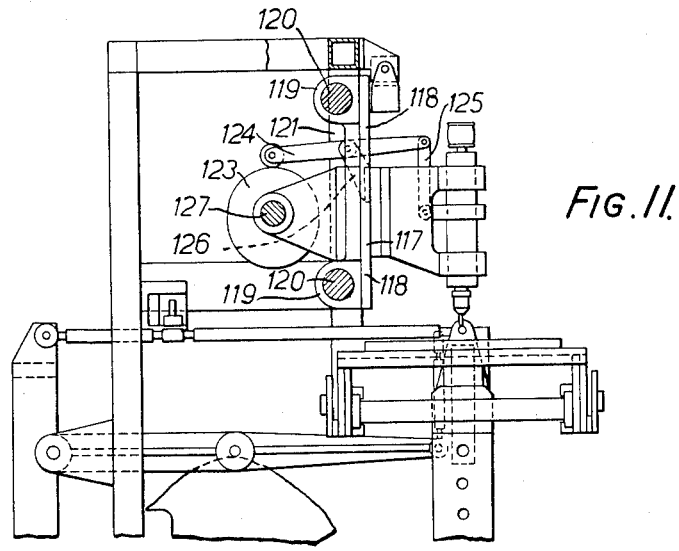
FIGURE 11 is a side view of FIGURE 10.
Figure 10:
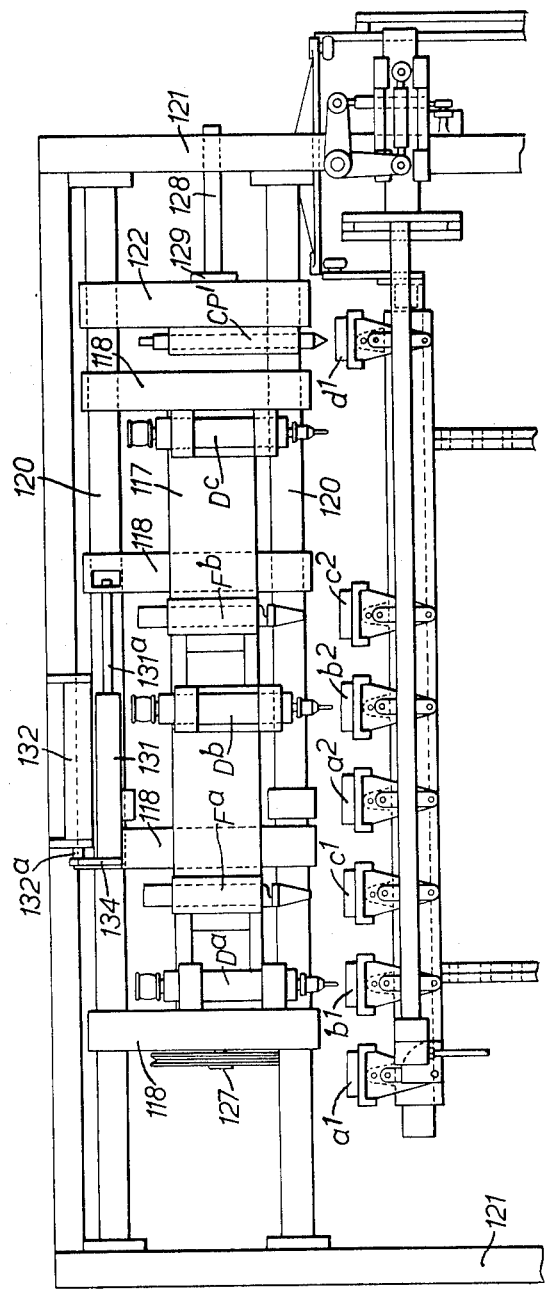
FIGURE 10 is an elevation of a further embodiment of the invention.

As illustrated in FIGURES 10–12, the apparatus is in the position for the start of a cycle of operations, and at the end of the first drilling and filling operation, fluid under pressure is supplied to the cylinder 132 to extend the piston rod so that the plate 117 is given a step-like movement from right to left as viewed in FIGURE 10 to position the tools $D^a$, $F^a$, $D^b$, $F^b$ over the workholders $a^1$, $b^1$, $a^2$ respectively. The control point being independently mounted does not take part in the movement of the plate 117. To effect a second step-like movement, fluid under pressure is supplied to the cylinder 131 to retract the piston rod 131a so that the end of this movement, the tools $F^a$, $D^b$, $F^b$, $D^c$ are positioned respectively over the workholders $a^1$, $c^1$, $a^2$, $c^2$.

To effect a third step-like movement, fluid under pressure is supplied to both cylinders 131, 132 to operate the pistons in the reverse directions so as to return the plate 117 and the tools mounted to the position indicated in FIGURE 10 ready for the start of another cycle of operations. It will be understood that the supply of fluid under pressure to effect the step-like movements will be automatically controlled in timed sequence to the operation of the machine so that these movements are effected at the completion of a drilling and filling operation.

It will be understood that during the step-like movements the brush stocks on the appropriate holders will be unclamped and clamped and during the drilling and filling operation filled brush stocks removed and undrilled brush stock substituted.

As in the previously described embodiments, the cycle of operations is repeated so that the apparatus operates continuously to drill and fill brush stocks.

It will be noted that in the embodiments illustrated in FIGURES 8 and 9 and 10 to 12 during each cycle of movements each of the workholders $a^1$, $b^1$, $c^1$ is presented to the filling tool $F^a$, and each of the workholders $a^2$, $b^2$, $c^2$ is presented to the filling tool $F^b$, and each of the workholders $a^1$ . . . $c^2$ is presented to one or other of the drilling tools $D^a$, $D^b$, $D^c$.

According to the embodiments so far described, spread effect is obtained by pivoting the workholders by the operation of cam 98. If desired, however, the tools themselves may be mounted so as to be capable of pivotal movement relative to the workholders as described in co-pending U.S. patent application Serial No. 337,306, filed Jan. 13, 1964 by Russell H. R. Parker.

Figure 14:
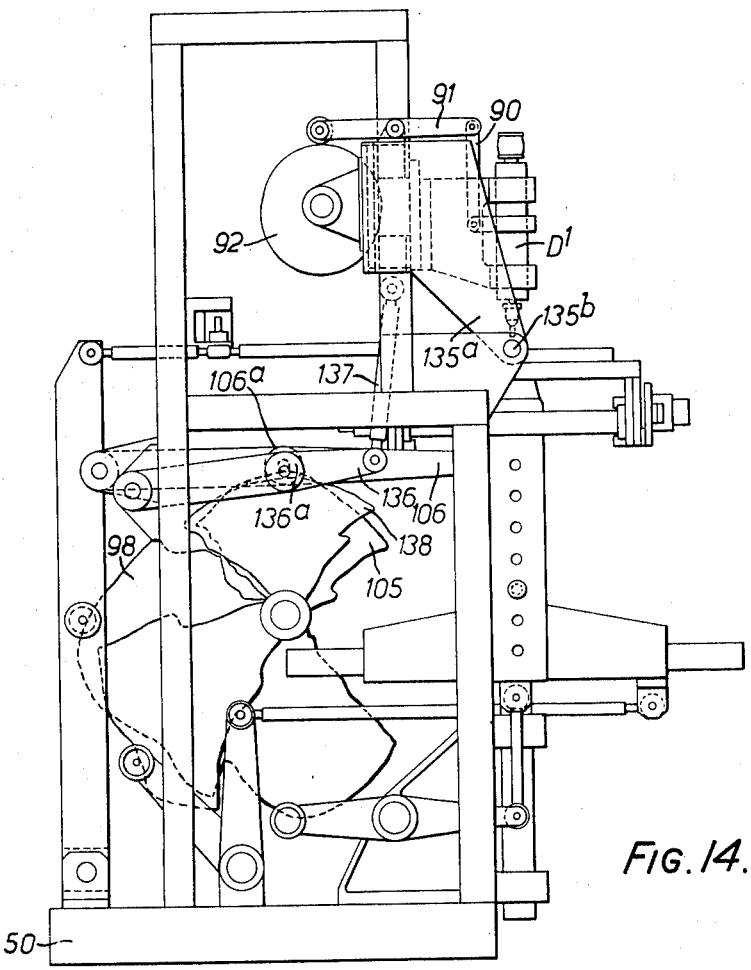
FIGURE 14 is a side view of FIGURE 13.

The embodiment illustrated in FIGURES 13 and 14 provide an arrangement of pivotally mounted tools, and in these figures it will be understood that the means for operating the workholders and the means for effecting the step-like movements are identical to that illustrated in FIGURES 8 and 9. As shown in FIGURES 13 and 14, the tools are supported on bars 135 connected to side plates 135a pivoted at 135b to part of the machine frame. The plates 135a are pivotally connected to a lever 136 by a link 137, the lever being adapted to be pivoted in a predetermined manner during the filling and drilling operations by a cam 138.

It will be understood that the predetermined amount of relative pivotal movement between the workholders and the tools must be capable of producing the desired angle of end spread. In the embodiment illustrated in FIGURES 8 and 9, the whole of this relative movement is effected by pivoting the workholders by means of the cam 98. With the pivoted tool arrangement illustrated in FIGURES 13 and 14, the cam 98 is designed to pivot the holders to produce a proportion of the total desired pivotal movement and the cam 138 is designed to effect the pivotal movement of the tools to produce the rest of the desired movement. Preferably, the design of the cams 98, 138 is such that the workholders are pivoted to provide the first part, for example, half the total movement, and the cam 138 then comes into operation to pivot the tool to effect the remainder of the desired movement. It will be understood that during the pivotal movement of the workholders, a concentric part of the cam 138 will engage the follower 136a on the lever 136 so that no movement will be imparted to the plate 135 on which the tools are mounted, and that while the tools are being pivoted by the cam 138, a concentric portion of the cam 98 will engage the follower 99a on the lever 99 so that no pivotal movement will be imparted to the workholders while the tools are being pivoted. While reference is made to the workholders and tools being each given half the total desired pivotal movement, this proportion may be varied as desired according to the type of brush stock being operated on.

It will be understood that the pivotal mounting of the tools described with reference to FIGURES 13 and 14 may be applied to the other embodiments illustrated in the drawings.

Figure 15:
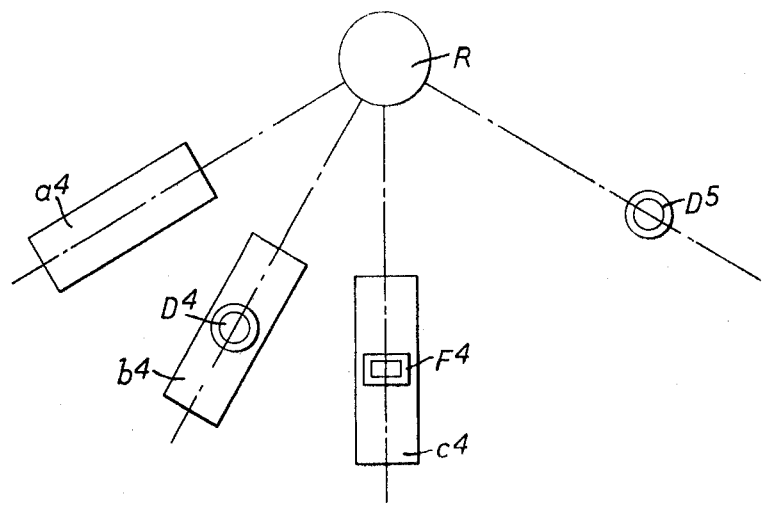
FIGURES 15, 16, 17 are diagrammatic illustrations of yet a further embodiment of the invention.
Figure 16:
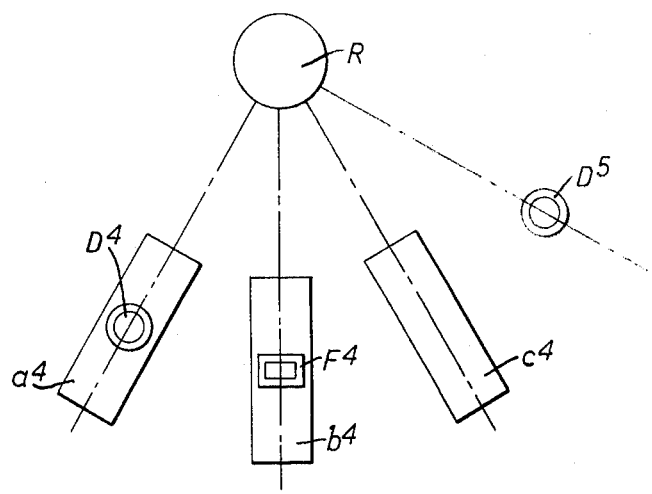
Figure 17:
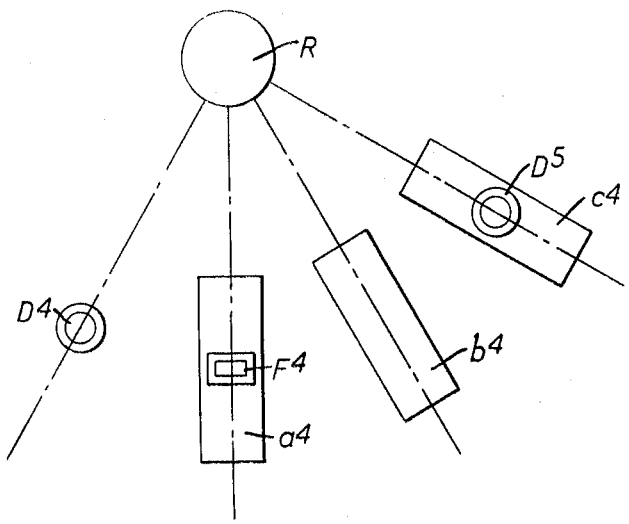

A further embodiment of the invention is illustrated diagrammatically in FIGURES 15, 16 and 17, wherein instead of the workholders being reciprocated in a linear path, they are oscillated through an arcuate path.

As shown, a workholder support indicated by R is provided supporting circumferentially spaced radially extending workholders indicated by $a^4$, $b^4$, $c^4$. The support R is mounted for rotational movement and means provided for effecting a cycle of three step-like movements comprising two single step-like rotational movements in a progressive manner in an anti-clockwise direction and a third double length steplike movement in a clockwise direction.

A series of tools is provided including a boring tool $D^4$ having a filling tool $F^4$ spaced therefrom the equivalent of a single step-like movement, and a second boring tool $D^5$ spaced from the filling tool the equivalent of two step-like movements. The tools are arranged for vertical reciprocal movement towards and away from the workholder which travel in an arcuate path beneath the tools.

The parts are illustrated in FIGURE 15 in the position they assume at the start of a cycle of operations, an undrilled brush stock being clamped to the workholders $a^4$, $b^4$, and the pre-drilled brush stock being clamped to the workholder $c^4$. Accordingly, during the first drilling and filling operation, the brush stock on the holder $b^4$ will be drilled and that on $c^4$, filled. Before the next drilling operation, the support R is given a single rotational step-like movement in an anti-clockwise direction into the position illustrated in FIGURE 16, wherein the workholder $a^4$ is opposite the boring tool $D^4$, the workholder $b^4$ is opposite the filling tool $F^4$, and the workholder $c^4$ is at a loading and unloading station between the tools $F^4$, $D^5$.

During the indexing movement the brush stock on holder $c^4$ is unclamped and that on $a^4$ clamped.

During the next drilling and filling operation, the brush stock on the holder $a^4$ will be drilled and that on the holder $b^4$ filled. The brush stock on the holder $c^4$ will be removed during the operation of the tools and a fresh undrilled brush stock substituted.

At the end of the second drilling and filling operation, the support R is given a second step-like rotational movement in an anti-clockwise direction into the position illustrated in FIGURE 17, wherein the workholder $a^4$ is opposite the filling tool $F^4$, the workholder $b^4$ opposite a loading and unloading station, and the workholder $c^4$ opposite the second boring tool $D^5$. During the indexing movement the brush stock on holder $b^4$ is unclamped and that on $c^4$ clamped. During the next operation of the tools, the brush stock on the holder $a^4$ will be filled and that on the holder $c^4$ drilled, and during the operation of the tools, the filled brush stock on the holder $b^4$ will be removed and a fresh undrilled brush stock substituted.

At the completion of this operation of the tools, the support R will be given the equivalent of two step-like movements in a clockwise direction to return it to the position indicated in FIGURE 15 ready for the start of another cycle of operations, and during this indexing movement the brush stock on holder $a^4$ is unclamped and that on $b^4$ clamped. During the next drilling and filling operation, the filled brush stock on the holder $a^4$ will be removed and a fresh undrilled brush stock substituted.

The cycle of operations is repeated so that as in the previously described embodiments, the apparatus will operate continuously to drill and fill brush stocks.

Figure 18:
FIGURES 18, 19, 20 are diagrammatic ilustrations of a modification of the embodiment illustrated in FIGURES 15–17.
Figure 19:
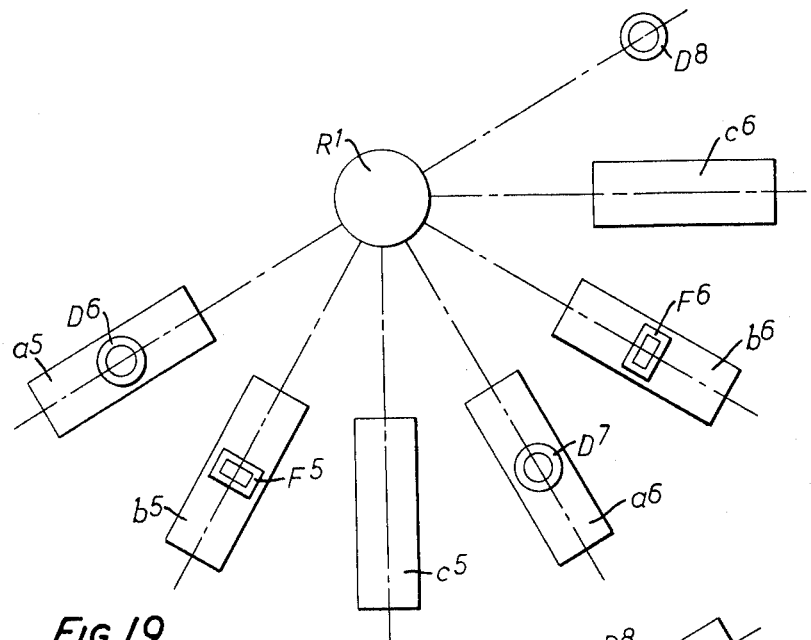
Figure 20:
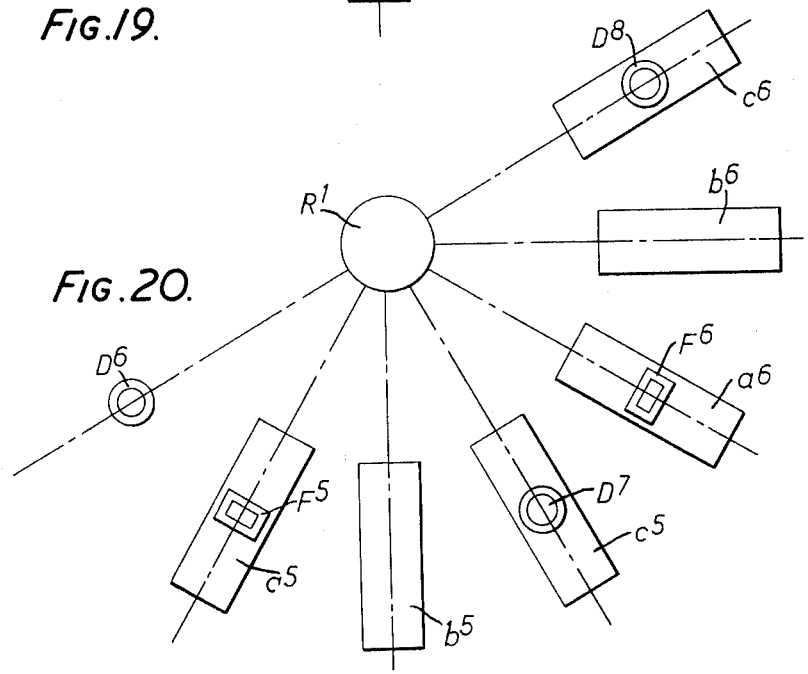

In FIGURES 18, 19, 20, a modificatoin is diagrammatically illustrated comprising a rotatably mounted support $R^1$ provided with two groups of three workholders $a^5$, $b^5$, $c^5$, $a^6$, $b^6$, $c^6$. Three boring tools $D^6$, $D^7$, $D^8$ are provided and two filling tools $F^5$, $F^6$. As in the embodiment illustrated in FIGURES 15, 16, 17, the support $R^1$ is given a cycle of three step-like rotational movements so that the workholders will be successively positioned relatively to the tools, FIGURE 18 illustrating the position at the start of a cycle, FIGURE 19 the position at the completion of the first step-like movement, FIGURE 20 the position at the completion of the second step-like movement. The third step-like movement will be in a reverse direction to the first two so that the support $R^1$ is returned to the position illustrated in FIGURE 18 ready for the start of another cycle.

The invention as described, with reference to any of the embodiments of the invention is not limited to the provision of one or two groups of workholders, as three or more groups of workholders could be provided.

The workholders will, of course, be mounted on the support R, $R^1$ for pivotal movement to enable side and end spread drilling and filling as required.

If desired, the apparatus may include one or more devices, for example, trimmers for operating on the brush after it has been filled. For example, by providing a four step cycle of movements, the filled brush stocks could be moved into operative relation to a trimmer as an additional step after the brush has been filled.

If desired, three or more groups of workholders may be provided, each group comprising at least three workholders, two boring and one filling tool being provided for the first group and an additional boring and filling tool for each additional group.

It will be noted that when three workholders are used, the cycle of transverse movements comprises three steps. Where more than three workholders are provided in each group, the number of step-like movements in a cycle will correspond to the number of workholders in the group.

Figure 21:
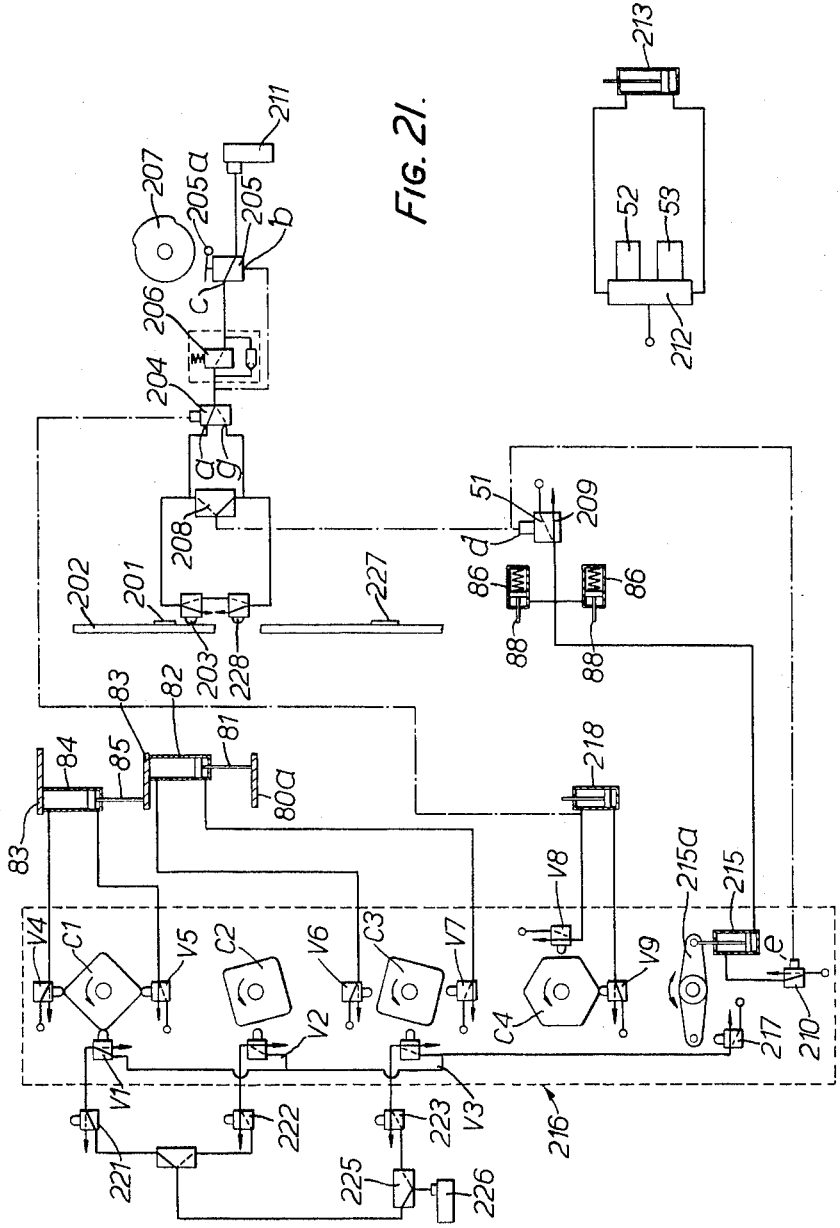
FIGURE 21 is a diagram illustrating the flow circuit of the fluid pressure means.
Figure 22:
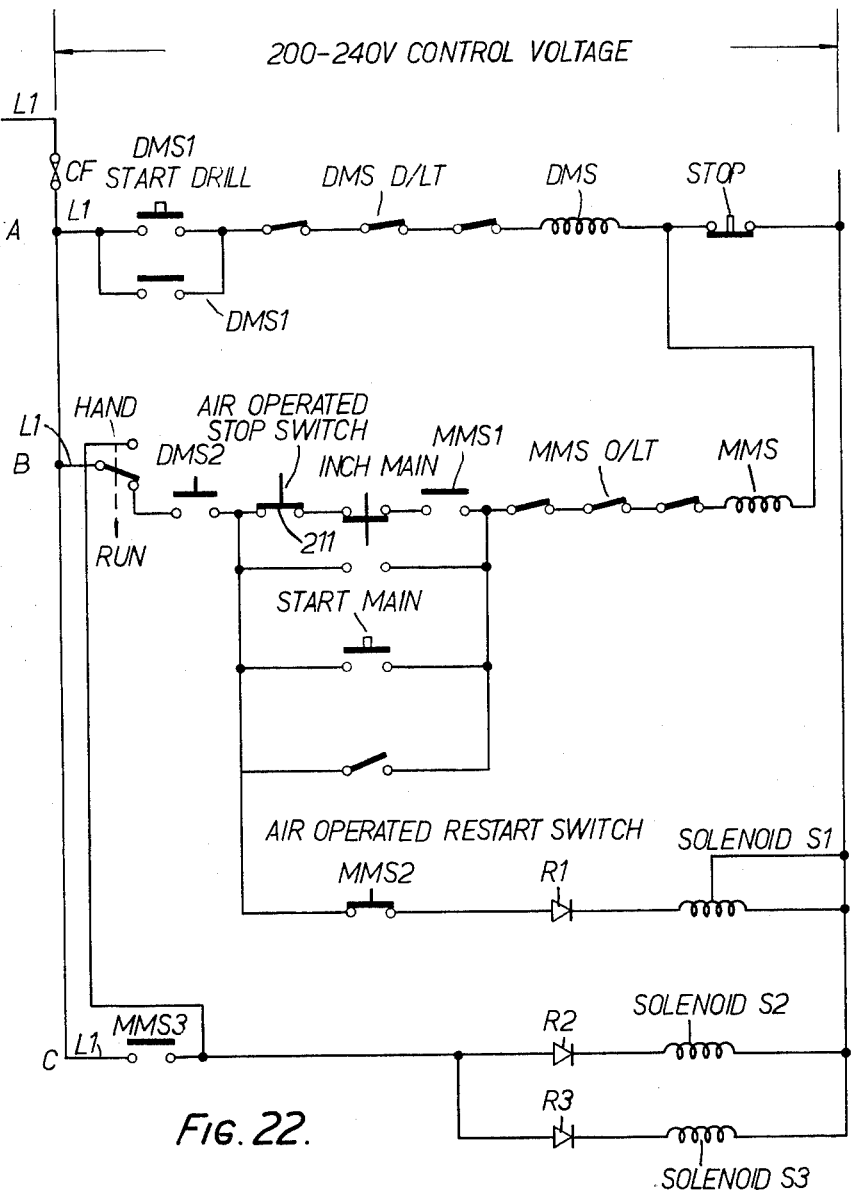
FIGURE 22 is a diagram illustrating the electrical circuiting.

With reference to the flow and electrical circuit diagrams illustrated in FIGURES 21 and 22 the brush making machine is started by first closing the tool motor starting switch DMS1, which starts the boring tools D rotating and causes the filling tools to operate, and then pressing the main motor starter switch MMS1, which starts a main drive shaft turning. This drive shaft carries a pattern cam 202. It will be noted that closing of the main motor starter switch MMS1 will complete a circuit only if the tool motor starter switch DMS1 has already been closed, so that the main motor can be started only when the tool motors are running. For reasons which will be later explained, the step-like indexing of the workholders can only be effected when the tool motors are running and the main motor is stopped. The tools D, $D^1$ and F are reciprocated towards and away from the workholders in timed sequence by a series of links and levers 90, 91 operated by cams 92 driven from the main power shaft of the machine. During the drilling and filling operation the workholders will be oriented with respect to the tools to enable the desired pattern of holes to be drilled and filled. The mechanism for controlling the orientation will be described later.

At the completion of the boring and filling operation, which corresponds to the completion of the pattern cam indexing movement on the last hole in a brush pattern, a plate 201 on pattern cam 202 depresses the valve 203. Air then passes through valve 203 to a port $a$ on valve 204 and through this valve to a port $b$ on valve 205 and through sequence valve 206 to the supply port $c$ on valve 205. At the time when air is supplied to port $b$ on valve 205, cam 207 will be in a position which allows the operating roller 205a of valve 205 to be moved into a cut-away portion of cam 207. Air also passes from valve 203 via shuttle valve 208 to the pilot supply port $d$ on pilot solenoid operated valve 209 and pilot supply port $e$ on valve 210.

As the main shaft continues to rotate, the last hole will be drilled and cam 207 will depress valve 205 to allow air to pass through to pressure operated electrical stop switch 211. This switch breaks the circuit to the main motor, leaving the drill motors running. An auxilary contactor MMS2 is simultaneously closed by the operation of the stop switch 211 to energise solenoid S1 on valve 209 through which air under pressure is supplied to the plunger assembly 86 (FIGURE 6a) to withdraw the plunger 88 from the aperture 89a so that the side bars 72a are uncoupled from the side bar 72 and are free to slide relatively thereto so that the workholders may index to the next position. Auxiliary contactor MMS3 is simultaneously opened by the operation of the switch 211 de-energising solenoids S2 and S3 of valve 212. Valve 212 then reverses the air supply to air cylinder 213 which applies a brake to the main shaft. The operation of valve 209 also permits air to pass to cylinder 215 which pivots a rocker 215a to impart a step-like indexing movement to the valve operating cams C1, C2, C3, C4 of the cam and valve assembly 216 to the next position. The application of pressure to pilot port $e$ on valve 210 will have exhausted the air from the other side of cylinder 215.

At the completion of the indexing movement of rocker 215a, valve 217 is operated and passes air to valves V1, V2 and V3, which supply air to valves 221, 222 and 223 situated at stations 1, 2 and 3 respectively. Valves V4 to V9 are all supplied direct from the main air line. The cams and valves of assembly 216 are shown in the position which brings the workholders to the extreme lefthand side of the machine described as station 1.

The operation when cams C1 . . . C2 are indexed to the next position is as follows:

The air supply from valves V8 and V9 to cylinder 218 is reversed and cylinder 218 causes a reversal gear to operate so that the pattern cam 202 may be run in the reverse direction.

Air is passed to pilot port $f$ on valve 204 which cuts the air supply to valve 205.

The air supply from valves V4 and V5 to cylinder 84 (FIGURES 3 and 4) is reversed and the workholders are indexed to the next position.

Air is also passed from valve V2 to valve 222.

Cylinder 84 is attached to the workholder frame by plate 83. The piston rod 85 of cylinder 84 is attached to cylinder 82 by plate 83, and the piston rod 81 of cylinder 82 is attached to the workholder slide by plate 80a. When the workholders reach the end of their indexing movement, valve 222 is depressed and air will be passed to the air operated switch 226 via shuttle valves 224 and 225 to restart the main motor.

Operation of switch 226 simultaneously breaks auxiliary contactor MMS2 so that solenoid S1 on valve 209 is de- energised and air under pressure is supplied to plunger assembly 86 (FIGURE 6a) and plungers 88 enter the apertures 89a to lock the side bar 72a to the side bar 72.

Operation of switch 226 also simultaneously closes auxiliary contactor MMS3 which energises solenoids S2 and S3 on valve 212 reversing the air supply to cylinder 213 to release the brake on the main shaft.

When the pattern cam 202 is rotating in a reverse direction and plate 201 will be disengaged from valve 203 cutting the supply of air to valve 204 and the pilot ports $d$ and $e$ of valves 209 and 210. Air through valve 210 will then be applied to cylinder 215 to return the indexing mechanism and cut the supply of air from valve 217 to valves V1, V2 and V3 and valve 222.

At the completion of the second drilling and filling operations on the brush stocks by the boring tools D, D¹ and the filling tool F, plate 227 on pattern cam 202 will depress valve 228 and air will be applied to port $g$ on valve 204 repeating the sequence of stopping the main motor, applying the brake on the main shaft, unlocking the workholders, indexing cam valve assembly 216 and reversing the direction of rotation of the pattern cams as previously described. At this stage valves V6 and V7 will reverse the supply of air to cylinder 82 and the workholders will be indexed to the third position in the cycle.

Air will also be supplied via valve V3 to valve 223.

The reversal of air to cylinder 218 will cut the pilot supply to port $f$ on valve 204 so that the supply of air to valve 205 is shut off.

The operation of restarting the main motor will be repeated as previously described when valve 223 is depressed on the workholders reaching the said third position in the cycle.

At the completion of a further drilling and filling operation, plate 201 on cam 202 will depress valve 203 and the workholder indexing sequence will be repeated.

In this case when the cams of assembly 216 are indexed, air valves V4, V5, V6 and V7 will reverse the supply of air to cylinders 84 and 82, returning the workholders to their original position and air will be supplied via valve V1 to valve 221. When this third indexing movement is completed, valve 221 will be depressed and the restarting sequence repeated.

It will be understood that the fluid flow and circuit diagrams of FIGURES 21 and 22 are in respect of the embodiment illustrated in FIGURES 3 to 7 but that subject to obvoius modifications similar control arrangements would be used for the other embodiments of the invention described in the specification and illustrated in the drawings.

What is claimed is:

1. Apparatus for boring and filling brush stocks comprising at least one set of aligned working tools, each set comprising a pair of boring tools and a filling tool positioned therebetween with one of said boring tools twice as far from said filling tool as the other, and a corresponding set of three workholders aligned in a direction parallel to each tool set for supporting brush stocks to be operated on by said tools, each workholder being spaced from an adjacent workholder by a distance equal to that between said other boring tool and said filling tool, means for operating said tools during spaced time intervals, means for moving said workholders as a unit relative to said tools in a cycle comprising first and second successive movements in a first direction, at the end of each of which movements a workholder previously positioned so that the brush stock therein could be operated on by the other boring tool assumes a position in which the brush stock therein may be operated on by said filling tool, followed by a third movement in the opposite direction at the end of which movement said workholders occupy the same position relative to said tools as at the beginning of the first movement in said first direction, and means for initiating said movements successively, one between each two successive intervals of tool operation.

2. Apparatus as claimed in claim 1 comprising a plurality of overlapping successively aligned sets of working tools, with said other boring tool of each set except the first positioned to serve as said one boring tool of the previous set, together with a single boring tool spaced from the end of the last set remote from the other sets by a distance equal to that between the filling tool and said one boring tool in each set.

3. Apparatus for boring and filling brush stocks comprising at least one set of aligned equally spaced working tools, said set including a group of tools with a first boring tool positioned at one end of said group, together with an additional boring tool spaced from the other end of the group by a distance twice that between the individual tools in said group, and a corresponding workholder set for each tool set, said workholder set comprising a plurality of workholders for supporting brush stocks to be operated on by said tools, said workholders being equal in number to the tools of said set and aligned in a direction parallel thereto, each workholder being spaced from an adjacent workholder by a distance equal to that between the tools in said group, means for operating said tools during spaced time intervals, means for moving said workholders as a unit relative to said tools in a cycle comprising as many successive movements in one direction as there are tools in said group, at the end of each of which movements a workholder previously positioned so that the brush stock therein could be operated on by said first boring tool assumes a position in which the brush stock therein may be operated on by an adjacent tool, followed by a movement in the opposite direction at the end of which movement said workholders occupy the same position relative to said tools as at the beginning of the first movement in said first direction, and means for initiating said movements successively, one between each two successive intervals of tool operation.

4. Apparatus as claimed in claim 3 comprising a plurality of successively aligned groups of working tools, each group spaced from the other by a distance equal to twice that between the tools within each group, with the first boring tool of each group except the first serving as the additional boring tool of a set including the preceding group of tools, together with a single additional boring tool spaced from the end of the last group remote from the other groups by a distance equal to that between groups to complete a set including said last group.

5. Apparatus as claimed in claim 3 in which the tools of each set are aligned on the periphery of a circle, and the workholders of each set are aligned on the periphery of a parallel circle of equal diameter, and said workholder movements take place along said last mentioned periphery.

6. Apparatus as claimed in claim 3 in which said tools and workholders are aligned along parallel straight lines.

7. Apparatus as claimed in claim 3 in which workholders are pivotally mounted, and comprising means for swinging said workholders relative to said tools during said intervals of tool operation.

8. Apparatus as claimed in claim 7 in which the tools of each set are mounted on a common bar, and comprising means for maintaining said bar at a constant distance from said workholders, regardless of the pivotal position of said workholders.

9. Apparatus as claimed in claim 3 in which the tools of each set are mounted on a single bar and comprising means for swinging said tools about the longitudinal axis of said bar during said intervals of tool operation.

10. Apparatus as claimed in claim 3 in which both said tools and said workholders are mounted for pivotal movement about parallel axes, and comprising means for swinging said tools and workholders during said intervals of tool operation.

11. Apparatus for boring and filling brush stocks comprising at least one set of aligned working tools, each set comprising a pair of boring tools and a filling tool positioned therebetween with one of said boring tools twice as far from said filling tool as the other, and a corresponding set of three workholders aligned in a direction parallel to each tool set for supporting brush stocks to be operated on by said tools, each workholder being spaced from an adjacent workholder by a distance equal to that between said other boring tool and said filling tool, means for operating said tools during spaced time intervals, means for moving said workholders as a unit relative to said tools in a cycle comprising a plurality of step-like movements in one direction and a single movement in the reverse direction equal in length to the sum of the first mentioned movements, said movements bringing said workholder set at the completion of each said movement into a position in which one workholder is positioned so that a brush stock therein may be operated on by a boring tool, another workholder is positioned so that a brush stock therein may be operated on by a filling tool and a further workholder is in spaced relation to the boring and filling tools so that a brush stock therein may be unloaded and a new brush stock loaded, and means for initiating said movements successively, one between each two successive intervals of operation of the tools.

No references cited.

GRANVILLE Y. CUSTER, JR., *Primary Examiner.*